United States Patent [19]
Van Ginkel et al.

[11] Patent Number: 5,891,339
[45] Date of Patent: *Apr. 6, 1999

[54] PROCESS FOR THE DEGRADATION OF CHLORITE

[75] Inventors: Cornelis Gijsbertus Van Ginkel, Wageningen; Alexander Gerardus Maria Kroon, Amersfoort; Rudolf Jan Van Wijk, Duiven, all of Netherlands

[73] Assignee: Akzo Nobel N.V., Arnhem, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 73,507

[22] Filed: May 6, 1998

Related U.S. Application Data

[63] Continuation of PCT/EP96/04877 Nov. 5, 1996.

[30] Foreign Application Priority Data

Nov. 7, 1995 [NL] Netherlands ............................ 1001583

[51] Int. Cl.⁶ .................................................... C02F 3/34
[52] U.S. Cl. ......................... 210/605; 210/606; 210/611; 210/632; 435/262; 435/262.5
[58] Field of Search ................................... 210/605, 606, 210/611, 612, 632, 902; 435/262, 262.5, 264, 822

[56] References Cited

U.S. PATENT DOCUMENTS

| | | | |
|---|---|---|---|
| 5,302,285 | 4/1994 | Attaway et al. | 210/611 |
| 5,352,608 | 10/1994 | Kaplan et al. | 435/262 |
| 5,468,628 | 11/1995 | Aust et al. | 435/262.5 |

OTHER PUBLICATIONS

Shahram Shahangian and Lowell P. Hager, The Reaction of Chloroperoxides with Chlorite and Chlorine Dioxide, *The Journal of Biological Chemistry*, vol. 256, No. 12 (Jun. 25, 1981) pp. 6034–6040.

Wolf Vishniac and Melvin Santer, The Thiobacilli, *Bacteriological Reviews*, vol. 21, (1957) pp. 195–213.

Fred A. Rainey and Erko Stackbrandt, Phlogenetic Evidence for the Relationship of *Saccharococcus thermophilus* to *Bacillus stearothermophilus*, *System Appl. Microbiol.* 16, (1993) pp. 224–226.

Purificn. of industrial waste water contg. (per) chlorate—by mixing with municipal waste water and treating with Vibrie dechloraticans cuznesove 8–1168. *Derwent Abstract*, NL 7408–898, Jan. 6, 1976.

Industrial effluent treatment—with biochemical redn. of inorganic oxygen cpds. *Abstract*, DT 2123093, Nov. 30, 1972.

Primary Examiner—Christopher Upton
Attorney, Agent, or Firm—Ralph J. Mancini

[57] ABSTRACT

The present invention provides a process for the degradation of chlorite into chloride and oxygen with the aid of chlorite dismutase or chlorites dismutase-containing microorganisms. Virtually quantitative degradation of chlorite is obtained in the absence of reductors and under either aerobic or anaerobic conditions.

10 Claims, 1 Drawing Sheet

PROCESS FOR THE DEGRADATION OF CHLORITE

The present application is a Continuation of International Application No. PCT/EP96/04877 filed Nov. 5, 1996.

FIELD OF THE INVENTION

The invention relates to a process for the biochemical degradation of chlorite into chloride and oxygen.

BACKGROUND OF THE INVENTION

S. Shahangian and L. P. Hager disclose in *The Journal of Biological Chemistry*, Vol. 256, 12 (1981) 6034, how chloroperoxidase from *Caldariomyces fumago* is used to first oxidize chlorite into chlorine dioxide, which chlorine dioxide may subsequently be dismutated to form chloride, oxygen and chlorate.

There are several drawbacks to said process. Apparently, the degradation of chlorite by chloroperoxidase results for the most part in chlorine dioxide which is an undesired product. It is true that said chlorine dioxide is partially converted into chloride at a later stage, but this reaction also sees the formation of undesired chlorate. In the end, it was found that about 43% of the chlorine bound in the chlorite was converted into chloride, while about 57% was converted into the undesired chlorate. Furthermore, the chlorite conversion proceeds most rapidly at a pH of less than 3.5. Such a low pH will be hindering to any other conversions intended to be performed simultaneously.

U.S. Pat. No. 5,302,285 discloses a process in which perchlorate-containing wastewater is subjected to microbiological treatment in a water-treatment plant (WTP) using an anaerobic and an aerobic reactor. In this process the perchlorate is reduced via chlorite to chloride in the first-stage anaerobic reactor using a bacterium named HAP1. Incidentally, it should be noted that this bacterium is capable of reducing chlorite to chloride enzymatically under anaerobic conditions. However, the reaction scheme in FIG. 4 of this reference indicates that the reduction of chlorite to chloride also requires a reductor. This shows that the enzyme responsible is a reductase. The reductor, e.g., hydrogen or formic acid, may also be provided by other bacteria. Also, during the reaction acids are formed which have to be neutralized, since HAP1 has optimum effectiveness in the pH range of 6.5 to 8.0.

DE-A-2,123,093 discloses a process for converting chlorine oxides with the aid of bacteria from activated sludge. This is achieved by feeding the effluent stream to be purified with a composition including many readily oxidizable compounds (reductors) and ensuring that the oxygen required for oxidation is present in a less than stoichiometric amount during anaerobic breakdown. This shows that said bacteria contain a reductase. The rate of conversion is very low. The presence of a dismutase is neither mentioned nor suggested.

NL-A-7,408,898 discloses how chlorate- or perchlorate-containing wastewater is purified anaerobically using microorganisms of the strain *Vibrio dechloraticans* Cusnesova B-1168, in the presence of readily oxidizable substances. The presence of a dismutase is neither mentioned nor suggested.

The invention now provides an improved process which substantially obviates the aforementioned drawbacks of the prior art.

SUMMARY OF THE INVENTION

The present invention generally relates to a process for the degradation of chlorite into chloride and oxygen, wherein a chlorite dismutase or one or more microorganism strains capable of producing chlorite dismutase is employed.

DETAILED DESCRIPTION OF THE INVENTION

Figure 1:
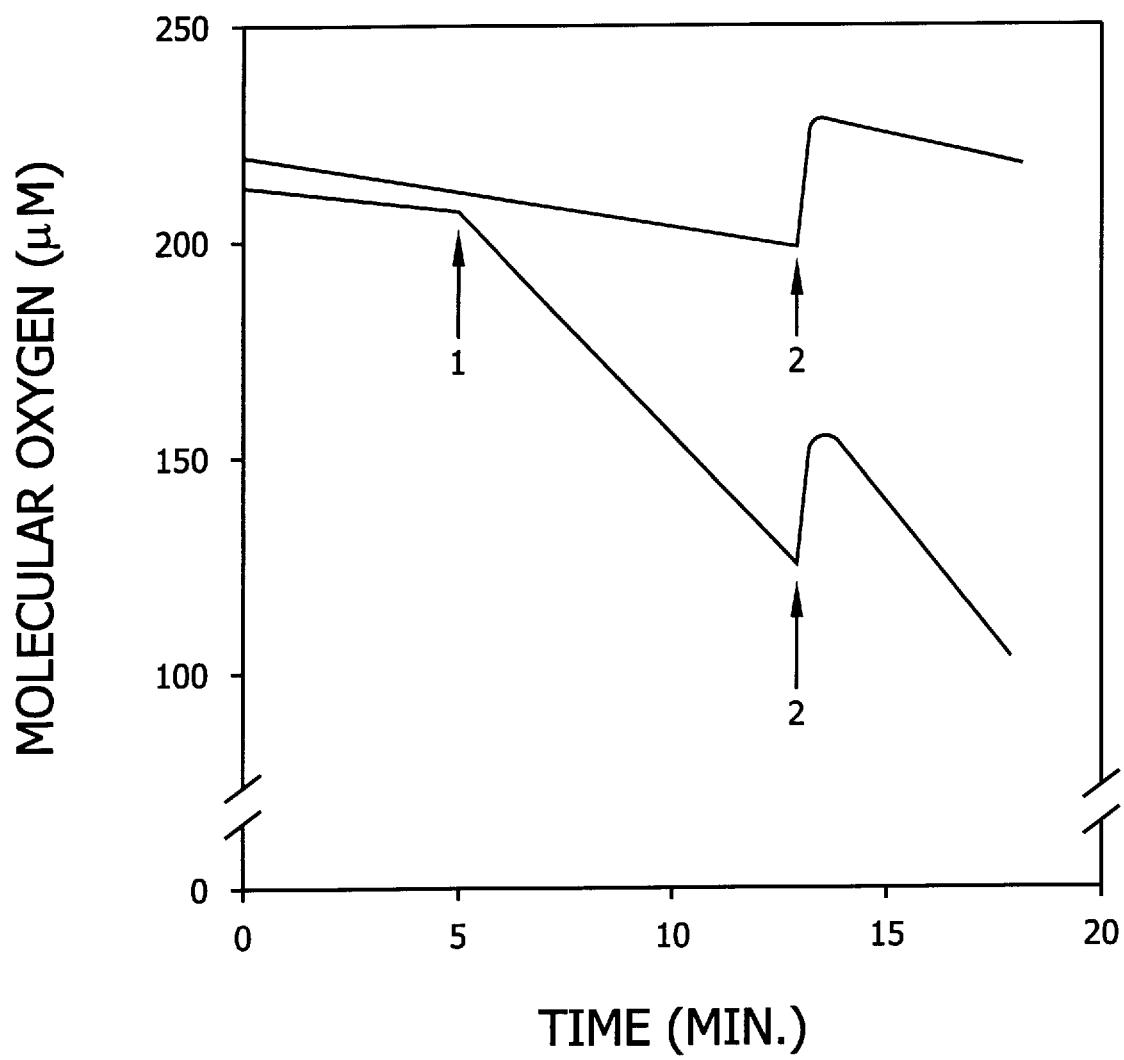
FIG. 1 shows the generation of oxygen from chlorite degradation.

The invention is characterized in that chlorite dismutase-containing microorganisms are used which are obtainable by enriching activated sludge or other sources of microorganisms with the aid of chlorate or perchlorate under anaerobic conditions.

Activated sludge contains a wide range of microorganisms. It was found that these generally include one or more microorganism strains which produce a chlorite dismutase and hence are able to convert chlorite virtually quantitatively into oxygen and chloride. After enrichment of the activated sludge under appropriate conditions, these specific organisms are able to convert chlorite virtually quantitatively into chloride and oxygen, both anaerobically and aerobically. In this process a rate of conversion is attainable which is high enough to convert substantially all of the chlorite within an acceptable period of time, e.g., the residence time in a water-treatment plant. At least one of the microorganism strains capable of effecting this belongs to the β-subgroup of the Proteobacteria (strain GR-1). It was found that strain GR-1 can be grown under aerobic or anaerobic conditions in a medium containing appropriate minerals, carbon or other energy source(s), and electron acceptor(s). To increase chlorite conversion efficiency, the Proteobacteria strains such as GR-1 are grown at least partially under anaerobic conditions.

Besides the above-described microorganisms as such, also the enzyme chlorite dismutase may be employed, which can be isolated from the microorganisms in a manner known to the person skilled in the art. When this enzyme is used to convert the chlorite, it is not required to have a reductor or a source of carbon or energy present, which shows the enzyme to be a chlorite dismutase. The chlorite conversion rates attained in this process are exceptionally high, i.e. about 6000 $\mu$mol/min.mg of protein. The pH usually is kept neutral during this reaction.

To efficiently remove chlorite according to the present invention, activated sludge or some other source of microorganisms is enriched with the chlorite dismutase-containing microorganism. Thus, the sludge can be advantageously used, e.g., as inoculum in a solution of salts. Exemplary of a suitable aqueous salt medium is the following composition (amounts per liter): 1.0 g $NaClO_4$, 1.55 g $K_2HPO_4$, 0.85 g $NaH_2PO_4$, 0.5 g $(NH_4)_2HPO_4$, 0.1 g $MgSO_4.7H_2O$, 1.7 mg $Na_2SeO_3$, 0.1 ml of a solution containing trace elements as described by Vishniac and Santer in *Bacteriol. Rev.*, 21 (1957), 159–231, and 1.0 g of $CH_3COONa$. Incubation at 30° C., under strictly anaerobic conditions, optionally followed by aerobic or aerobic/anaerobic incubation, after some time gives an enriched culture satisfying the set requirements. If desired, other sources of carbon or energy may be employed instead of sodium acetate, while chlorate may be used to replace the perchlorate as the electron acceptor.

The term "strictly anaerobic conditions" as used in the present specification refers to conditions in which virtually all oxygen has been removed from the reaction medium, e.g., by passing nitrogen through the solution before the start of the reaction. The term "aerobic/anaerobic conditions" refers to those conditions where oxygen cannot enter the reaction system but dissolved oxygen is still present in the system initially.

When the activated sludge has been enriched in the desired manner, once again different electron acceptors and carbon or energy sources can be employed for the further growth of the microorganisms. For instance, in the case of strain GR-1 oxygen was found to make a suitable electron acceptor and aerobically grown bacteria were found to convert chlorite. Similarly, if so desired, other sources of carbon or energy can be employed by replacing the acetate in the aforementioned salt solution. Optionally, the desired microorganism can be isolated from the medium in which it is enriched in a conventional manner. It is also possible to prepare a washed cell suspension of the microorganism or to isolate the chlorite dismutase from the microorganism, all in a conventional manner.

Suitable for use are all chlorite dismutase-containing microorganisms which are obtainable by means of the indicated procedure. Exemplary is the isolation from this group of suitable microorganisms of a strain of the β-subgroup of the Proteobacteria having the following morphological and physiological characteristics:

gram negative oxidase positive motile, rod-like no assimilation of glucose, arabinose, mannose, mannitol, N-acetyl-glycosamine, maltose, gluconates, adipates or phenyl acetate no indole formation from tryptophane no acidogenesis of glucose does not contain any β-glucosidase, β-galactosidase or protease.

when perchlorate is present as electron acceptor, acetates, propionates, caprionates, malonates, succinates, and lactates can serve as source of carbon or energy. Formates, glycolates, and citrates, however, are not suitable for use in growing the microorganism, nor are ethanol and glycine.

when an acetate is used as carbon or energy source, perchlorates, chlorates, nitrates, nitrites, Mn(IV), and oxygen are suitable electron acceptors for growing the microorganism. However, when nitrate is used for the culture, the bacteria obtained are less effective in chlorite dismutation. Chlorite, bromate, iodate, sulphate, selenate, and Fe(III) were found to be unsuitable as electron acceptor. When chlorate or perchlorate is used as electron acceptor, the chlorine bound herein is recovered as chloride after conversion.

colonies on an agar plate were round and red or white, depending on whether perchlorate or oxygen was used as electron acceptor.

The conversion of chlorite with the aid of the enriched activated sludge, and/or specific microorganisms obtainable therefrom, and/or washed cell suspensions, and/or a dismutase is carried out under both aerobic and anaerobic conditions.

Depending on the medium in which the activated sludge is found and on the apparatus in which chlorite dismutation takes place, other substances can be degraded simultaneously with the chlorite. Usually, though not necessarily, the breakdown of the other substances will be performed by other microorganisms present in the activated sludge.

The dismutation of chlorite can be effected under a wide range of conditions. The examples below start from a neutral pH and a temperature of 30° C., with excellent results. Depending on the circumstances, however, the conditions can be optimized in a conventional manner. Generally a temperature between 5° and 35° C. and a pH in the range of 5 to 9 is applied. Optimum results are obtained at a temperature between 20° and 35° C. and a pH in the range of 5.5 to 6.5. The chlorite may be present in a specific, well defined solution which is added to the aforementioned solution of salts or to a buffer solution with suspended cells. Alternatively, the chlorite may be present in a non-univocal effluent stream containing varying amounts of impurities including chlorite. In that case the choice among the use of enriched cultures, e.g., of activated sludge or washed cell suspensions thereof or enzyme(s) isolated therefrom, and the optional use of carrier materials will be dependent on the conditions under which the dismutation takes place. In a WTP the use of enriched activated sludge is preferred. Also, it is well-known that the activity of microorganisms and enzymes will, among others, depend on the concentration of the chlorite. The maximum chlorite concentration that is tolerated by the microorganisms or enzymes according to the present invention, is easily determined by means of routine experimentation. The process is particularly suitable for purifying media containing chlorite, e.g., as a result of disinfecting, for instance, in the case of brewery rinse water treated with $ClO_2$. However, the removal of chlorite from drinking water treated with $ClO_2$ is also envisaged.

Due to the high rate of chlorite turnover, the oxygen generated during the conversion is released in the gaseous form if a sufficiently high concentration of chlorite and chlorite dismutase is selected. In that case, the chlorite dismutase can be added in the most appropriate form. This oxygen gas may be the object of the use of chlorite and chlorite dismutase, e.g., in the case of utilization in an aerobic WTP where the generated oxygen gas is absorbed by the activated sludge to give enhanced biodegradation efficiency. Also, the oxygen gas can serve to improve, e.g., the microenvironment, an aspect which may play a part when purifying soil or groundwater.

The invention will be illustrated by the following non-limiting examples.

EXPERIMENTAL

Unless specified otherwise, all reagents used in these experiments were of conventional commercial quality (reagent grade) and utilized without further purification.

The sodium chlorite was obtained from Fluka and was found to contain 20% v/v chloride. This content was compensated for in the experiments. Since aqueous chlorite solutions are unstable, a fresh solution was prepared daily. DNase from bovine pancreas was obtained from Sigma Aldrich. Agar from Oxoid. Q-Sepharose® fast flow, Phenyl-Superose® HR 5/5, Superdex® 200 and protein standards for gel filtration were purchased from Pharmacia LKB Biotechnology. Hydroxyapatite Bio-Gel Hydrotalcite and SDS-Page standards were from Bio-Rad.

Microorganisms which effectively break down chlorite were obtained by using activated sludge as inoculum in an enrichment step in which an aqueous solution of salts was incubated at 30° C. under strictly anaerobic conditions. The aqueous solution of salts contained per liter: 1.0 g $NaClO_4$, 1.55 g $K_2HPO_4$, 0.85 g $NaH_2PO_4$, 0.5 g $(NH_4)_2HPO_4$, 0.1 g $MgSO_4 \cdot 7H_2O$, 1.7 mg $Na_2SeO_3$, 0.1 ml of a solution containing trace elements as described by Vishniac and Santer in *Bacteriol. Rev.*, 21 (1957) 159–231, and 1.0 g $CH_3COONa$. As described above, other sources of carbon or energy than the acetate and other electron acceptors than the perchlorate can also be used.

The microorganisms from the enriched culture were isolated using agar plates made of the aforementioned solution of salts and 5 g of agar per liter of solution, at 30° C. and under anaerobic conditions, with the medium containing the enriched activated sludge serving as inoculum.

Characterization of the obtained microorganisms was in accordance with the API 20NE protocol, as issued by the manufacturer of the API system (Montalieu-Vercieu, France). The 16S rDNA sequence was determined by DSM (Deutsche Sammlung von Microorganismen und Zelikulturen, Braunschweig, Germany), in accordance with the method described by Rainey c. s. in *Syst. Appl. Bacteriol.*, 16 (1992) 224–226.

The evaluation of suitable electron acceptors, by substitution of the perchlorate, took place in a 100 ml Erlenmeyer flask at 30° C. and pH 7, by measuring the rate of chloride formation where applicable, or else by measuring the change in the medium's turbidity with the aid of a nephelometer, Ratio XR made by Hach, Loveland Colo., USA. Other sources of carbon or energy were evaluated in a similar way, by replacement of the acetate in the solution.

Washed cells were obtained from cultures where the desired microorganisms are present in the enriched form or exclusively, by centrifuging the culture for 5 minutes at 26,000 g and then suspending the centrifuge cake in an 8 mM potassium sodium phosphate buffer of pH 7 and centrifuging again in this manner. This procedure was repeated twice.

In a final step the cells were suspended in said buffer until a concentration of about 10 g of protein per liter was attained.

To obtain a cell-free extract including the chlorite dismutase, 20 ml of a suspension of washed cells were subjected five times to 50 Watt ultrasonic treatment for 20 sec each to destroy the cells.

The oxygen generation was measured using a biological oxygen meter (Yellow Springs Instruments, Yellow Springs Ohio, USA). The pH of the solutions was determined in a conventional manner. For gravimetric determination of the dry weight of a biomass, filtration was carried out through a 1.2 µm cellulose nitrate filter, followed by 120 minutes of drying at 105° C. The protein content was determined with the aid of bicinchonic acid. HPLC was employed for acetate analysis, with 20 mM of $H_2SO_4$ serving as the eluent. Prior to HPLC analysis the samples were filtered (0.8 µm) and diluted 1:1 with 200 mM of $H_2SO_4$. Silver nitrate was used for the titrimetic chloride determination. The chlorite content was measured by titrating iodine resulting from the reaction of chlorite and iodide at pH 2, with a 10 mM thiosulphate solution. The nitrite and nitrate contents were determined calorimetrically after reaction with Griess-Romijn reagent and 2,6-dimethylphenol in sulphuric acid, respectively.

EXAMPLE 1

For the enrichment of chlorite dismutase-containing microorganisms a sample of activated sludge was taken from the Nieuwgraaf water-treatment plant in Duiven, which treats mostly domestic waste water. A 300 ml bottle with a glass stopper was filled completely with an aqueous solution containing salts in amounts defined above. This solution was inoculated with an amount of the activated sludge corresponding to 2 mg dry weight of activated sludge per liter. The culture was incubated at 30° C. under strictly anaerobic conditions until a clear growth of microorganisms was observed. In the case of the sludge sample employed, increased turbidity was observed after one week, indicating the growth of microorganisms. Also, chloride was found in the culture at that time. For further enrichment 3 ml of the culture was used as an inoculum in a fresh salt solution. This subculture was treated in the same manner as the original culture. The suitable microorganisms were enriched in this fashion twice more and then isolated and characterized.

In this manner a bacterium (strain GR-1) which dismutates the chlorite and belongs to the β-subgroup of the Proteobacteria was obtained. The microorganisms are rod-like and form round, red colonies in a culture on an agar plate under anaerobic conditions. In the case of an aerobic culture with only oxygen for an electron acceptor, the colonies are white.

EXAMPLE 2

The growth of the chlorite dismutase-containing microorganisms using different sources of carbon or energy was measured by determination of the amount of chloride formed from the perchlorate. To this end 100 ml Erlenmeyer flasks were filled for 75% with the salt solution disclosed above containing the acetate or some other source of carbon or energy in a concentration of 1 gram per liter. The culture was incubated under anaerobic conditions at 30° C. on a shaker (100 rpm) for 2 weeks. The following data was recorded for strain GR-1; see Table 1.

TABLE 1

| Carbon source | Growth |
| --- | --- |
| sodium acetate | ++(14.4 ± 2.2) |
| sodium propionate | ++ |
| sodium capronate | + |
| sodium malonate | ++ |
| sodium succinate | ++ |
| sodium lactate | ++ |
| sodium formate | 0 |
| sodium glycolate | 0 |
| sodium citrate | 0 |
| ethanol | 0 |
| glycine | 0 |
| glucose | 0 |

++ good growth, with the figure in parentheses listing the amount of formed biomass, as dry substance, per mole of carbon source.
+ poor growth.
0 zero growth.

In the cases where growth was observed, the perchlorate was converted into chloride.

EXAMPLE 3

Turbidity measurements were used to study which electron acceptors can be used to grow strain GR-1 when sodium acetate is provided as carbon and energy source. To this end 100 ml Erlenmeyer flasks were filled for 75% with the aforementioned salt solution in which the perchlorate was replaced by the electron acceptor in question in a concentration of 1 gram per liter. Next, the culture was incubated for 2 weeks under anaerobic conditions at 30° C. on a shaker (100 rpm). The procedure was slightly altered only for the evaluation of nitrate and oxygen. In both cases 300 ml Erlenmeyer flasks and 30 ml of the salt solution were used. During the oxygen evaluation air was passed through, and hence aerobic conditions prevailed. See Table 2.

TABLE 2

| Electron acceptor | Growth | Rate of division (hours) | Growth yield (mg/mol C) |
|---|---|---|---|
| $NaClO_4$ | ++ | 7 | 14.4 ± 2.2 |
| $NaClO_3$ | ++ | 7 | 16.4 ± 0.3 |
| $NaNO_3$ | ++ | 9 | 11.9 ± 0.4 |
| $NaNO_2$ | 0 | | |
| $Mn(IV)O_2$ | + | | |
| $O_2$ | ++ | 3 | 15.9 ± 0.6 |
| $NaClO_2$ | 0 | | |
| $KBrO_3$ | 0 | | |
| $NaIO_3$ | 0 | | |
| $Na_2SO4$ | 0 | | |
| $Na_2SeO_4$ | 0 | | |
| $Fe(III)Cl_3$ | 0 | | |

++ good growth,
+ poor growth,
0 zero growth

The number of hours given under rate of division indicates the time needed by the bacteria of strain GR-1 to redouble. The growth yield is the amount (mg) of biomass formed, as dry substance, obtained per mole of carbon source.

EXAMPLE 4

The chlorite dismutating microorganisms grown using perchlorate are obtainable as washed cells displaying activity similar to the original cultures. The washed cells of strain GR-1 obtained as disclosed showed the following rates of conversion in $\mu$mole of electron acceptor per minute per mg of protein, under the conditions listed in Example 3. See Table 3.

TABLE 3

| Electron acceptor | Rate of conversion ($\mu$mol/min. mg protein) |
|---|---|
| $NaClO_4$ | 0.043 |
| $NaClO_3$ | 0.057 |
| $NaNO_3$ | 0.001 |
| $NaNO_2$ | 0.003 |
| $O_2$ | 0.088 |
| $NaClO_2$ | 10.0 |

EXAMPLE 5

The dismutase of sodium chlorite was again studied in accordance with the procedure described in Example 4, except that there was no carbon or energy source present in the reaction mixture. Again, a rate of conversion of about 10 $\mu$moles of sodium chlorite per minute per mg of protein was observed.

EXAMPLES 6 AND 7

The dismutase of chlorite was studied in greater detail by measuring the oxygen content in 5 ml of a washed cell suspension to which sodium chlorite was added in the presence of oxygen. Following the spiking with sodium chlorite (0.035 mmole), a virtually stoichiometric amount of oxygen was generated, as is clear from FIG. 1. The sodium chlorite was introduced at the moment identified as 2. The presence or absence of a reductor was found not to affect the chlorite conversion, as is clear from the equal increase in oxygen content from point 2 in both curves, only one of which had seen a sodium acetate addition to the reaction mixture, i.e. at point 1.

COMPARATIVE EXAMPLE A

The experiment of Example 5 was repeated, except that there were no washed cells. No chlorite conversion was observed.

COMPARATIVE EXAMPLE B

The experiment of Example 5 was repeated, except that the washed cells were first deactivated by a heat treatment (short period of boiling). There was no chlorite conversion.

EXAMPLES 8 AND 9

The microorganisms were grown under both aerobic/anaerobic and under strictly anaerobic conditions, respectively. It was found that the adaptation phase was shorter under aerobic/anaerobic conditions, as shown in the following Table 4.

TABLE 4

| | Anaerobic culture | | Aerobic/Anaerobic culture | |
|---|---|---|---|---|
| Time (days) | perchlorate (mM) | chloride (mM) | perchlorate (mM) | chloride (mM) |
| 0 | 8.0 | 0 | 8 | 0.2 |
| 2 | n.d. | n.d. | 8 | 0.2 |
| 3 | n.d. | n.d. | 4 | 4 |
| 4 | 7.8 | 0.1 | 0.9 | 6.8 |
| 8 | 2.5 | 5.5 | n.d. | n.d. |
| 9 | 0.4 | 7.8 | 0.9 | 7.9 |
| 11 | 0.4 | 7.9 | n.d. | n.d. |
| 12 | 0.2 | 7.8 | 0.2 | 8.0 | n.d. = not determined

EXAMPLE 10

The experiment of Example 5 was repeated using washed cells of strain GR-1, which were grown using chlorate in the medium instead of perchlorate. Comparable results were obtained.

EXAMPLE 11

The chlorite dismutase was obtained from isolated strain GR-1, grown using perchlorate, in the following manner. To effect the destruction of the bacterium cells a cell suspension was subjected to about 1000 barg in a French press, after which 1 mg of DNase from bovine pancreas was added. Whole cells and solid residue of cell material were removed by centrifuging at 110,000 g for 1 hour at 4° C. The enzyme in the above liquid was then purified in accordance with Table 5.

The enzyme had a molecular mass of 140,000 daltons, the sub-units had a mass of 32,000 daltons. The Soret peak in the UV-VIS spectrum and an Fe3+ analysis indicated that the enzyme in question was a Fe-haemenzyme. In addition to iron, the enzyme was found to contain Se. The chlorite dismutase was therefore considered to be a selenocysteine-containing enzyme.

The enzyme activity was determined by the subsequent addition to 5 ml of a phosphate buffer of pH 7.2 (15 mM $KH_2PO_4/K_2HPO_4$), at a temperature of 30° C., of 20 $\mu$l of the enzyme solution containing 1.29 mg of protein per liter and 100 $\mu$l of a 15.2 mM $NaClO_2$ solution. The rate of conversion measured was about 2000 $\mu$moles of chlorite per minute per mg of protein.

TABLE 5

ENZYME PURIFICATION TABLE (Chlorite dismutase)

| Step | V (ml) | sp. act. ($\mu$mol/min.mg) | protein (mg/l) | protein (mg) | units ($\mu$mol/min) | recovery % | purification step |
|---|---|---|---|---|---|---|---|
| Supernatant | 30.4 | 144.5 | 12200 | 370.9 | 53595 | 100 | 1 |
| Q Sepharose | 79.9 | 482.5 | 1087 | 86.9 | 41965 | 78.3 | 3.3 |
| Hydroxyapatite | 106.6 | 909.4 | 324.7 | 34.6 | 31432 | 58.6 | 6.3 |
| Phenyl Superose | 26.3 | 1586 | 591 | 15.52 | 24611 | 45.9 | 11.0 |
| Microsep 30K (concentration) | 2.8 | 1983 | 4349 | 12.16 | 24119 | 45.0 | 13.7 |
| Superdex 200 | 36.0 | 1982 | 321.7 | 11.58 | 22986 | 42.9 | 13.7 |

EXAMPLE 12

The preceding example was repeated, except that the phosphate buffer was replaced by neutralized influent (pH=7.0) from the WTP of Akzo Nobel Chemicals in Rotterdam (original pH=8.3). The chlorite rate of conversion measured was about 1500 $\mu$moles per minute per mg of protein.

EXAMPLE 13

Example 11 was repeated, with the enzyme activity determined in an 8 mM potassium phosphate buffer of which the pH was set at the indicated value. At a pH of about 6, a maximum chlorite conversion rate was measured. The results are shown in Table 6.

TABLE 6

| pH | Rate of conversion ($\mu$mol chlorite/min. mg of protein) |
|---|---|
| 4.5 | <100 |
| 5 | <100 |
| 5.5 | 5000 |
| 6 | 6000 |
| 6.5 | 4500 |
| 7 | 2400 |
| 7.5 | 1600 |
| 8 | 700 |
| 8.5 | 200 |
| 9 | <100 |

We claim:

1. A process for the degradation of chlorite into chloride and oxygen which comprises treating said chlorite with a chlorite dismutase, or one or more microorganism strains capable of producing chlorite dismutase.

2. The process of claim 1 wherein said chlorite dismutase-producing microorganism strains are obtainable by enrichment of activated sludge or another source of microorganisms with the aid of chlorate or perchlorate under anaerobic conditions.

3. The process of claim 2 wherein said chlorite dismutase-producing microorganism strains are grown under partially aerobic and partially anaerobic conditions.

4. The process of claim 1 wherein said chlorite dismutase-producing microorganism strains are employed in the form of washed cell suspensions.

5. The process of claim 1 wherein said chlorite dismutase-producing microorganism strains belong to the Proteobacteria.

6. The process of claim 5 wherein said dismutase-producing microorganism strains belong to a β-subgroup of Proteobacteria.

7. The process of claim 1 wherein the degradation of the chlorite is carried out in an aqueous effluent stream.

8. The process of claim 7 wherein the degradation of the chlorite is carried out in a water-treatment plant.

9. The process of claim 1 wherein the chlorite degradation is carried out at a pH between 5 and 9 and a temperature in the range of 5° to 35° C.

10. The process of claim 9 wherein the chlorite degradation is carried out at a pH between 5.5 and 6.5 and a temperature in the range of 20° to 35° C.

* * * * *